United States Patent [19]
Ruch et al.

[11] Patent Number: 6,115,245
[45] Date of Patent: Sep. 5, 2000

[54] COMPUTER DOCKING STATION WITH HALF-HEIGHT BAYS AND ASSOCIATED SECURITY SYSTEM

[75] Inventors: Mark H. Ruch, Woodlands; Steven S. Homer, Cypress; Greangsak Jongolnee, Houston, all of Tex.

[73] Assignee: Compaq Computer Corporation, Houston, Tex.

[21] Appl. No.: 08/910,696

[22] Filed: Aug. 13, 1997

Related U.S. Application Data

[62] Division of application No. 08/735,753, Oct. 23, 1996.

[51] Int. Cl.[7] .................................................. G06F 1/16
[52] U.S. Cl. .................................... 361/685; 361/686
[58] Field of Search ............................... 361/685, 686; 439/928.1

[56] References Cited

U.S. PATENT DOCUMENTS 5,299,089  3/1994  Lwee ........................................ 361/685
5,305,180  4/1994  Mitchell et al. ......................... 361/685
5,483,419  1/1996  Kaczeus, Sr. et al. .................. 361/686
5,740,012  4/1998  Choi ......................................... 361/685
5,805,412  9/1998  Yanagisawa et al. .................... 361/686
6,010,344  1/2000  Muramatsu et al. ..................... 439/159

*Primary Examiner*—Leo P. Picard
*Assistant Examiner*—John D. Reed

[57] ABSTRACT

A computer docking station has a disk drive module incorporated therein which is capable of operatively receiving a disk drive therein. The disk drive module is also capable of being operatively installed within a desktop computer or other enclosure having a half-height bay therein. Security features of the docking station include preventing access by unauthorized persons to the disk drive, and preventing ejection of the disk drive from the disk drive module. Additionally, multiple disk drive modules may be cooperatively linked in the docking station so that the security features relating to each of the disk drive modules may be simultaneously actuated.

37 Claims, 8 Drawing Sheets

COMPUTER DOCKING STATION WITH HALF-HEIGHT BAYS AND ASSOCIATED SECURITY SYSTEM

This is a division, of application Ser. No. 08/735,753, filed Oct. 23, 1996.

CROSS-REFERENCE TO RELATED APPLICATION

This application is related to a copending application entitled "COMPUTER DOCKING STATION WITH INTEGRAL BASE SECURITY SYSTEM", attorney docket no. CMPQ-1210, and having Mark H. Ruch, Steven S. Homer, Kelly K. Smith, Jason Q. Paulsel, and Greangsak Jongolnee as inventors thereof. The copending application is incorporated herein by this reference.

BACKGROUND OF THE INVENTION

1. Field of the Invention

The present invention relates generally to personal computers and, in a disclosed preferred embodiment, more specifically provides a computer docking station with half-height bays and associated security system.

2. Description of Related Art

It is well known in the art to enhance the convenience of using a portable, notebook, or laptop computer (hereinafter, a "portable" computer) by providing a docking station to which the computer may be interconnected. In this manner, the computer is readily interconnected to a relatively large monitor, additional storage devices, such as disk drives, additional capabilities, such as those provided by PCMCIA cards, networks, speakers, input devices, additional microprocessors and memory devices, etc., when the computer is docked with the docking station in a user's office or home.

When the computer is not docked with the docking station, the user typically does not wish unauthorized persons to have access to the storage devices, including the disk drives, which may be incorporated into the docking station. Unfortunately, in conventional docking stations, if another person has a computer which is compatible with the docking station, that person is typically able to dock their computer with the docking station and thereby gain access to the disk drives therein.

In addition, conventional docking stations are typically configured to receive desktop computer-type disk drives therein. These desktop computer-type disk drives may be conventional floppy disk and/or hard disk drives. Unfortunately, installation and removal of these disk drives is difficult and time-consuming for the typical user.

Recently, portable disk drives have been developed for portable computers which are easily inserted into and ejected from the portable computers in a manner similar to the way in which floppy disks are inserted into and ejected from floppy disk drives. This advancement in the art now permits disk drives to be transported and interchanged between computers, substantially enhancing the user's convenience. For example, if the user has a computer configured to accept a portable disk drive both at home and at work, the user can easily work at home by transporting a portable hard disk drive containing necessary data and programs from the computer at work to the computer at home.

It would, thus, be advantageous for the user's docking station to be provided with the ability to operatively accept one or more portable disk drives therein. Unfortunately, due to the very portability of the disk drives, this situation would also increase the security concerns associated with the docking station, since an unauthorized person could easily eject the portable disk drives from the docking station when the user is away from the docking station.

From the foregoing, it can be seen that it would be quite desirable to provide a computer docking station which does not permit unauthorized access to disk drives installed therein and does not permit portable disk drives in the docking station to be removed from the docking station by unauthorized persons, but which permits convenient utilization of portable disk drives by the computer when it is docked with the docking station. It is accordingly an object of the present invention to provide such a computer docking station.

SUMMARY OF THE INVENTION

In carrying out principles of the present invention, in accordance with a preferred embodiment thereof, a computer docking station is provided which includes at least one disk drive module configured to operably receive a disk drive therein. Once received in the disk drive module, further features of the present invention, which may be incorporated into the preferred embodiment, include security features which prevent access to the disk drive and/or prevent ejection of the disk drive from the disk drive module.

In basic terms, a disclosed computer docking station includes at least one disk drive module for operatively receiving a disk drive therein. The disk drive module includes an enclosure, a drive engagement member, and a retaining member.

The enclosure, which may include a chassis and a face plate, has an opening formed thereon. The opening is complementarily shaped for receiving the disk drive therein.

The drive engagement member is slidably disposed on the enclosure. It is capable of engaging the disk drive when the disk drive is received in the enclosure. When so engaged, reception of the disk drive in the enclosure slides the engagement member rearwardly relative to the enclosure.

The retaining member is disposed on the enclosure. It is capable of displacing relative to the engagement member. The retaining member is cooperatively engageable with the engagement member to prevent ejection of the disk drive. To permit ejection of the disk drive, the retaining member is displaced relative to the engagement member to thereby disengage the retaining member from the engagement member.

Also provided is a computer docking station having security features incorporated therein associated with one or more disk drive modules of the docking station. Each of the disk drive modules operatively and removably receives a disk drive therein and includes an enclosure, an ejection member, and a latching member.

The enclosure has an opening formed thereon, which is complementarily shaped for receiving the disk drive therein. The ejection member is slidably disposed on the enclosure. The ejection member is capable of displacing relative to the enclosure in a direction to thereby eject the disk drive when the disk drive is received in the enclosure.

The latching member is also disposed on the enclosure. It is capable of engaging the ejection member to thereby prevent displacement of the ejection member relative to the enclosure in the direction to eject the disk drive.

Additionally, a computer docking station is provided by the present invention, which permits security features of multiple disk drive modules to be interconnected. The security features may be configured for simultaneous actuation thereof, or security features of certain ones of the disk drive modules may be deactivated as desired.

The docking station includes first and second disk drive modules. Each of the disk drive modules includes an enclosure, an ejection member, a latching member, and an actuating member. The enclosure has an opening formed thereon complementarily shaped for receiving a disk drive therein.

The ejection member is slidably disposed on the enclosure, and is capable of displacing relative to the enclosure in a direction to thereby eject the disk drive when the disk drive is received in the enclosure.

The latching member is also disposed on the enclosure, and is capable of engaging the ejection member to thereby prevent displacement of the ejection member relative to the enclosure in the direction to eject the disk drive.

The actuating member is slidably disposed on said enclosure, and is positionable in a selected one of a first position in which the actuating member biases the latching member to engage the ejection member, and a second position in which the actuating member permits the latching member to be disengaged from the ejection member.

DETAILED DESCRIPTION

Figure 1:
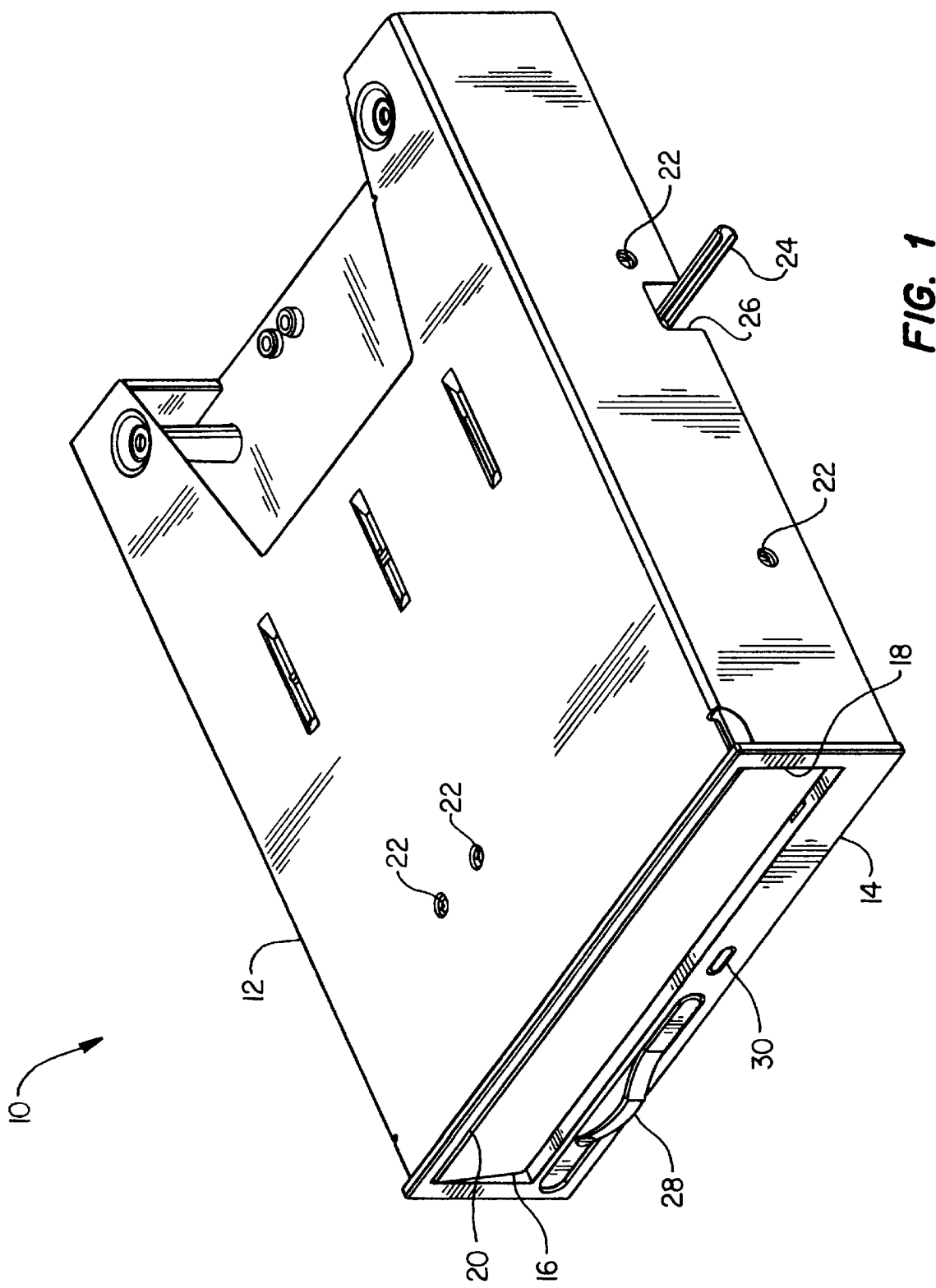
FIG. 1 is a top perspective view of a disk drive module embodying principles of the present invention.

Representatively illustrated in FIG. 1 is a disk drive module 10 embodying principles of the present invention. As shown and described herein, the disk drive module 10 is configured for mounting within a conventional half-height disk drive dimensional and operational envelope. It is to be understood, however, that the disk drive 10 may be otherwise dimensioned and mounted without departing from the principles of the present invention.

The disk drive module 10 includes a generally boxshaped chassis 12, a generally rectangular face plate 14, and a generally rectangular door 16. As shown in FIG. 1, the door 16 covers a complementarily shaped opening 18 formed through the face plate 14 and is hingedly attached proximate an upper edge 20 of the opening.

Several mounting holes 22 are provided through the chassis 12 for use in securing the disk drive module 10 within a half-height bay of a computer, docking station, or other enclosure. For example, the disk drive module 10 may be operatively installed within a desktop computer having one or more half-height bays therein. However, it is to be understood that the disk drive module 10 may also be utilized as a stand-alone unit.

A bar 24 extends laterally outward through a recess 26 formed on the chassis 12. As will be more fully described hereinbelow, the bar 24 permits actuation of a security feature of the present invention, and also permits interconnection of the safety feature between multiple disk drive modules 10 (see FIGS. 4–6). In operation of the security feature, laterally inward displacement of the bar 24 prevents ejection of a portable disk drive (not shown in FIG. 1) from the disk drive module 10.

An eject button 28 is laterally slidingly disposed on the face plate 14. When a portable disk drive is operatively received within the disk drive module 10, the eject button 28 may be pushed laterally to the left as viewed in FIG. 1, in order to eject the portable disk drive from the disk drive module 10. Note that the portable disk drive will not be ejected from the disk drive module 10 if the bar 24 has been laterally inwardly displaced.

Also disposed on the face plate 14 is a disk drive operation indicator 30. The indicator 30 is illuminated if the portable disk drive received in the disk drive module 10 is operating, thereby indicating the disk drive's operation to a user and warning the user not to eject the disk drive while it is operating.

Figure 2:
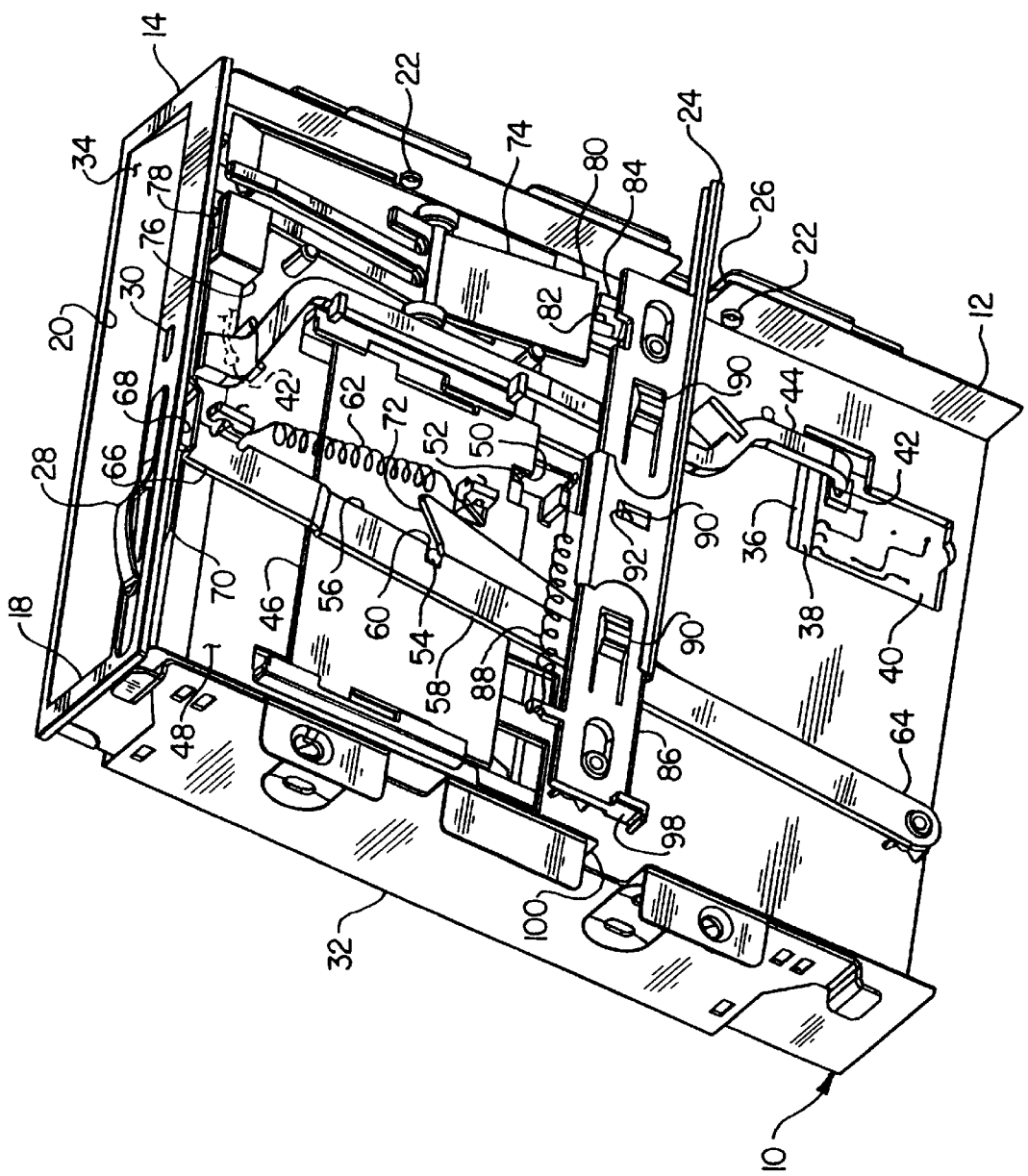
FIG. 2 is a bottom perspective view of the disk drive module of FIG. 1, showing a disk drive operatively installed therein.

Referring additionally now to FIG. 2, the disk drive module 10 is shown from a bottom side perspective view. A cage 32 has been mounted to the chassis 12, utilizing fasteners (not shown) secured through the cage and into the holes 22. The representatively illustrated cage 32 permits convenient mounting of the disk drive module 10 within a docking station described more fully hereinbelow, but it is to be understood that other methods may be utilized to mount the disk drive module 10 without departing from the principles of the present invention. For example, the disk drive module 10 could be mounted directly to a suitably configured housing without utilizing a separate cage 32.

In FIG. 2, the disk drive module 10 is shown with a portable disk drive 34 operatively installed therein, an electrical connector 36 disposed on the disk drive 34 making electrical contact with a complementarily configured electrical connector 38 disposed on a printed circuit board (PCB) 40 mounted within the disk drive module 10. Also disposed on the PCB 40 is a light-emitting diode (LED) 42, which is lighted when the disk drive 34 is operating. Light from the LED 42 is transmitted to the indicator 30 on the face plate 14 via an elongated clear plastic portion 44 (also known as a "light pipe") of the indicator.

The LED 42 may be otherwise mounted with respect to the light pipe 44 without departing from the principles of the present invention. For example, in FIG. 2, the LED 42 is shown in dashed lines installed in an alternate location with respect to the light pipe 44. At this location, the LED 42 is inserted into a recess (not visible in FIG. 2) formed into the light pipe 44.

When the disk drive 34 is inserted inwardly through the opening 18, a number of separate, but functionally interrelated, events occur. As described hereinabove, the connector 36 on the disk drive 34 operatively engages the connector 38 on the PCB 40, thereby enabling power supply, data transmission, etc., between the disk drive and the computer and/or docking station, or other equipment to which the disk drive module 10 may be operatively connected. Additionally, an upwardly extending projection 50 formed on a sled 46 slidably mounted on a bottom side 48 of the disk drive module 10 engages a shoulder 52 formed on the disk drive 34, causing the sled to be displaced rearwardly. Furthermore, a downwardly extending pin 54 formed on the sled 46 rearwardly traverses a side edge 56 of an actuating lever 58, until the pin engages a recess 60 formed laterally into the edge of the lever.

The side edge 56 of the lever 58 is maintained in contact with the pin 54 by a biasing force exerted by a spirally wound extension spring 62 attached at one end to the lever, and at its other end to the sled 46. The spring 62 at the same time biases the sled 46 forward, so that the sled is capable of forcing the disk drive 34 (due to the contact between the projection 50 and the shoulder 52) forwardly and outwardly through the opening 18 when the disk drive 34 is ejected.

It will be readily apparent from a careful consideration of FIG. 2 and the foregoing description that the cooperative engagement of the pin 54 with the recess 60, after the disk drive 34 has been operatively installed in the disk drive module 10 as shown in FIG. 2, prevents the disk drive from being ejected from the disk drive module. If the pin 54 were not engaged in the recess 60, the spring 62 would bias the sled 46 forwardly and the sled would, in turn, transmit the forwardly biasing force to the disk drive, thereby ejecting the disk drive from the disk drive module.

The lever 58 is pivotably mounted at one end 64 to the bottom side 48 of the disk drive module 10. At its other end 66, the lever 58 is received in a slot 68 formed through a laterally extending eject member 70. The eject member 70 is slidably disposed to the rear of the face plate 14 and is secured to the eject button 28 via an opening formed through the face plate (not visible in FIG. 2). Thus, when the eject button 28 is slid laterally to the left as viewed in FIG. 2, the eject member 70 is also caused to slide laterally to the left, in turn causing the end 66 of the lever 58 to be displaced laterally to the left (due to cooperative engagement of the end 66 in the slot 68), thereby pivoting the lever 58 counterclockwise about its end 64 as viewed in FIG. 2, against the biasing force of the spring 62. When the lever 58 is pivoted counterclockwise about its end 64, the pin 54 is permitted to disengage from the recess 60, since the recess is thereby displaced laterally away from the pin.

The lever 58 includes a forwardly inclined edge 72 formed thereon adjacent and laterally opposite the recess 60. When the lever 58 is pivoted counterclockwise as described above to disengage the pin 54 from the recess 60, the inclined edge 72 will contact the pin after it disengages from the recess. It will be readily apparent to one of ordinary skill in the art that pin 54 does not necessarily contact the inclined edge 72 when it disengages from the recess 60, since the spring 62 may immediately displace the sled 46 forwardly with respect to the lever 58 before the inclined edge is displaced sufficiently laterally to contact the pin. However, the applicants have found through experimentation, adjustment of the biasing force exerted by the spring 62, geometry of the lever 58, sled 46, etc., that with a disk drive 34 operatively installed in the illustrated preferred embodiment of the disk drive module 10, the pin 54 will contact the inclined edge 72 after the pin is disengaged from the recess 60.

In the preferred embodiment representatively illustrated in FIG. 2, one of the main reasons the sled 46 typically does not immediately slide forward to eject the disk drive 34 from the disk drive module 10 when the pin 54 is disengaged from the recess 60 is that greater force is generally required to separate the connectors 36, 38 than is exerted by the spring 62 on the sled 46. It will be readily apparent to one of ordinary skill in the art that the spring 62 could be designed to exert greater biasing force, the connectors 36, 38 could be designed to have less required force of separation, etc., so that the spring 62 could immediately displace the sled 46 forwardly when the pin 54 is disengaged from the recess 60.

However, the applicants prefer that the spring 62 not exert an exceedingly large biasing force on the sled 46, since that may make it somewhat difficult for the user to install the disk drive 34 in the disk drive module 10 and may eject the disk drive from the disk drive module too forcefully. Of course, a person of ordinary skill in the art may modify the spring 62, sled 46, etc. to include cams, dampers, etc., in order to modify the force, speed of ejection, etc. of the disk drive 34, without departing from the principles of the present invention.

As discussed hereinabove, a security feature of the disk drive module 10 is actuated utilizing a laterally disposed bar 24. This security feature acts to prevent pivoting displacement of the lever 58 when the disk drive 34 is operatively installed in the disk drive module 10. Such pivoting displacement of the lever 58 is prevented by engagement of a latch 74 with the eject member 70 when the bar 24 is displaced laterally inward relative to the disk drive module 10.

The latch 74 is pivotably mounted to the bottom side 48 of the disk drive module 10 and includes an upwardly extending end portion 76. When the security feature is disengaged, the end portion 76 is downwardly disposed relative to an inwardly extending end portion 78 of the eject member 70. However, when the security feature is engaged by inwardly displacing the bar 24, an opposite end portion 80 of the latch 74 is downwardly displaced relative to the bottom side 48, thereby pivoting the latch and upwardly displacing the end portion 76 into engagement with the end portion 78 of the eject member 70.

With the end portions 76 and 78 engaged, the eject member 70 is prevented from laterally displacing relative to the face plate 14. Thus, if the user (or an unauthorized person) attempts to eject the disk drive 34 from the disk drive module 10 by applying a lateral force to the eject button 28, the eject button will not displace relative to the face plate 14, the eject member 70 will not displace, and the end 66 of the lever 58 will not displace, thereby preventing ejection of the disk drive from the disk drive module.

The end portion 80 of the latch 74 is displaced upwardly or downwardly relative to the bottom side 48 depending upon the relative positions of a pin 82 formed on the end portion 80 and a ramp 84 formed on an actuating member 86. The actuating member 86 is laterally slidably disposed relative to the bottom side 48 and is biased rightwardly as viewed in FIG. 2 by a spirally wound extension spring 88 operatively mounted between the actuating member and the bottom side. The bar 24 is selectively positionable relative to the actuating member 86 by means of three resilient fingers 90 formed on the actuating member which are complementarily shaped to engage an opening 92 formed through the bar 24. Thus, the bar 24 is slidably disposed relative to the actuating member 86 between three positions determined by the laterally spaced apart fingers 90.

Figure 7:
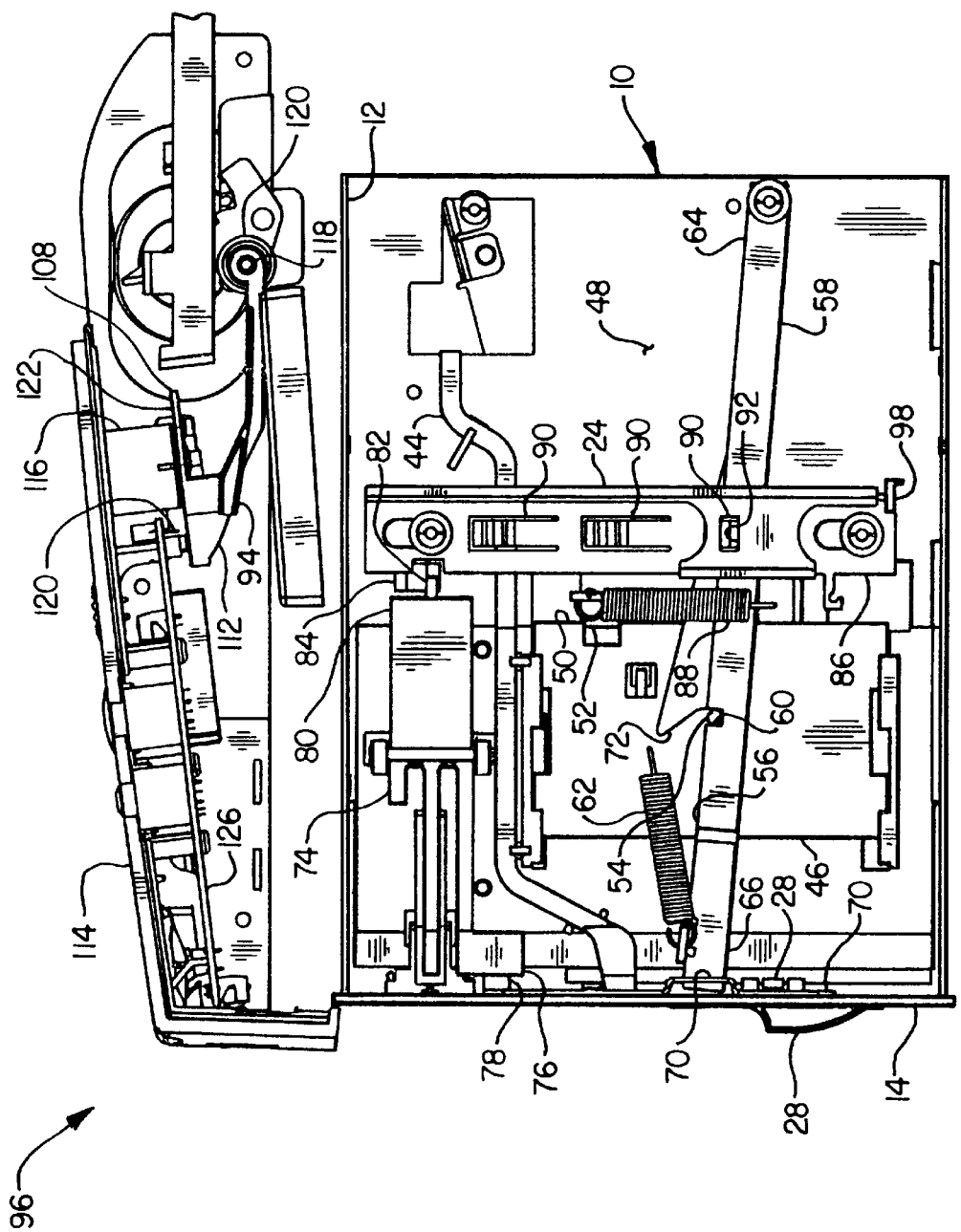
FIG. 7 is a bottom plan view of one of the disk drive modules and the control module shown in FIG. 6.

As viewed in FIG. 2, the bar 24 is positioned relative to the actuating member 86 so that the security feature may be actuated by a cam-operated lever 94 in a docking station 96 (see FIG. 7). If the bar 24 is displaced rightwardly as viewed in FIG. 2 so that the next finger 90 to the right is engaged with the opening 92, the bar will be positioned so that it may be linked with another disk drive module 10 (see FIG. 4), thereby permitting the security feature to be enabled and disabled simultaneously for multiple disk drive modules. If the bar 24 is displaced leftwardly as viewed in FIG. 2 so that the next finger 90 to the left is engaged with the opening 92, the bar will be positioned so that it does not project laterally outward from the disk drive module 10 (see FIG. 7), thereby preventing actuation of the security feature in the representatively illustrated preferred embodiment. It is to be understood that other positions, and different numbers of positions, of the bar 24 relative to the actuating member 86 may be provided without departing from the principles of the present invention.

Note that when the actuating member 86 is in its rightmost position relative to the bottom side 48, as representatively illustrated in FIG. 2, the pin 82 on the latch 74 is disposed relative to the ramp 84 so that the end portion 76 is correspondingly pivoted out of engagement with the end portion 78 of the eject member 70. When, however, the actuating member 86 is displaced laterally leftward as viewed in FIG. 2, the pin 82 is displaced downwardly relative to the bottom side 48 by the ramp 84, the ramp being correspondingly downwardly inclined for this purpose, and the end portion 76 is, thus, pivoted into engagement with the end portion 78 of the eject member 70. In the preferred embodiment, the end portion 80 produces a smaller moment than does the end portion 76 of the latch 74, so that the latch is weight-biased to pivot downwardly at the end portion 76 and, correspondingly, upwardly at the end portion 80. It is to be understood that other means of biasing the end portion 76 downwardly out of engagement with the end portion 78 and/or biasing the end portion 80 upwardly into engagement with the ramp 84 may be provided without departing from the principles of the present invention, for example, a spring may be provided for this purpose.

A generally laterally outwardly facing pad 98 is formed on the actuating member 86. Laterally opposite the pad 98 a recess 100 is formed on the chassis 12. When multiple disk drive modules 10 are linked, as described hereinabove and as representatively illustrated in FIG. 4, the recess 100 of one disk drive module is positioned laterally opposite the recess 26 of another disk drive module, thereby permitting the bar 24 of the other disk drive module to extend laterally through the recess 100 and abut the pad 98. In this manner, when the bar 24 of the first disk drive module is displaced laterally inward to actuate the security feature, the actuating member 86 of the first disk drive module is laterally displaced, thereby laterally displacing the pad 98 thereof, and causing the bar 24 of the second disk drive module to be correspondingly laterally inwardly displaced. Thus, the security features of both of the disk drive modules 10 are simultaneously enabled or disabled by displacement of one of the bars 24.

Figure 3:
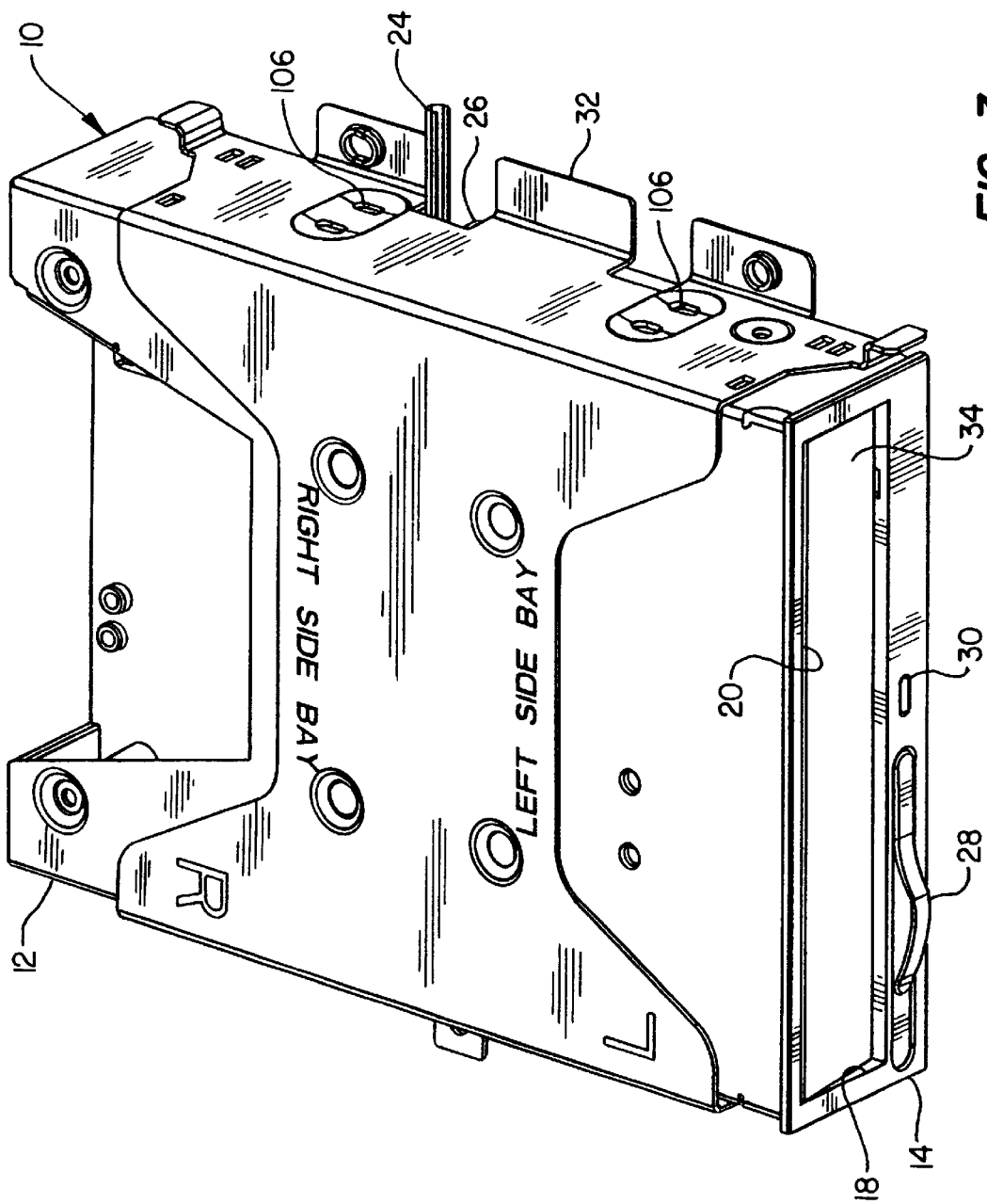
FIG. 3 is a top perspective view of the disk drive module of FIG. 1, showing the disk drive module received in a drive module cage.

Referring additionally now to FIG. 3, the disk drive module 10 is shown disposed within the cage 32. Note that the cage 32 is reversible relative to the disk drive module 10 from a position wherein the cage and disk drive module are configured for installation in a left side bay 102 to a position wherein the cage and disk drive module are configured for installation in a right side bay 104 of the docking station 96. When properly configured for installation in one of the bays 102, 104, fasteners (not shown) are installed through openings 106 (only two of which are visible in FIG. 3) and secured into threaded holes 22.

It will be readily appreciated by one of ordinary skill in the art that more than two disk drive modules 10 may be linked as described hereinabove, that otherwise configured cages 32 may be provided for mounting the disk drive module 10 within the docking station 96, and that the relative positionings of disk drive modules and cages within the docking station may be varied. These and similar modifications may be made to the cage 32, disk drive module 10, and docking station 96 without departing from the principles of the present invention.

Figure 4:
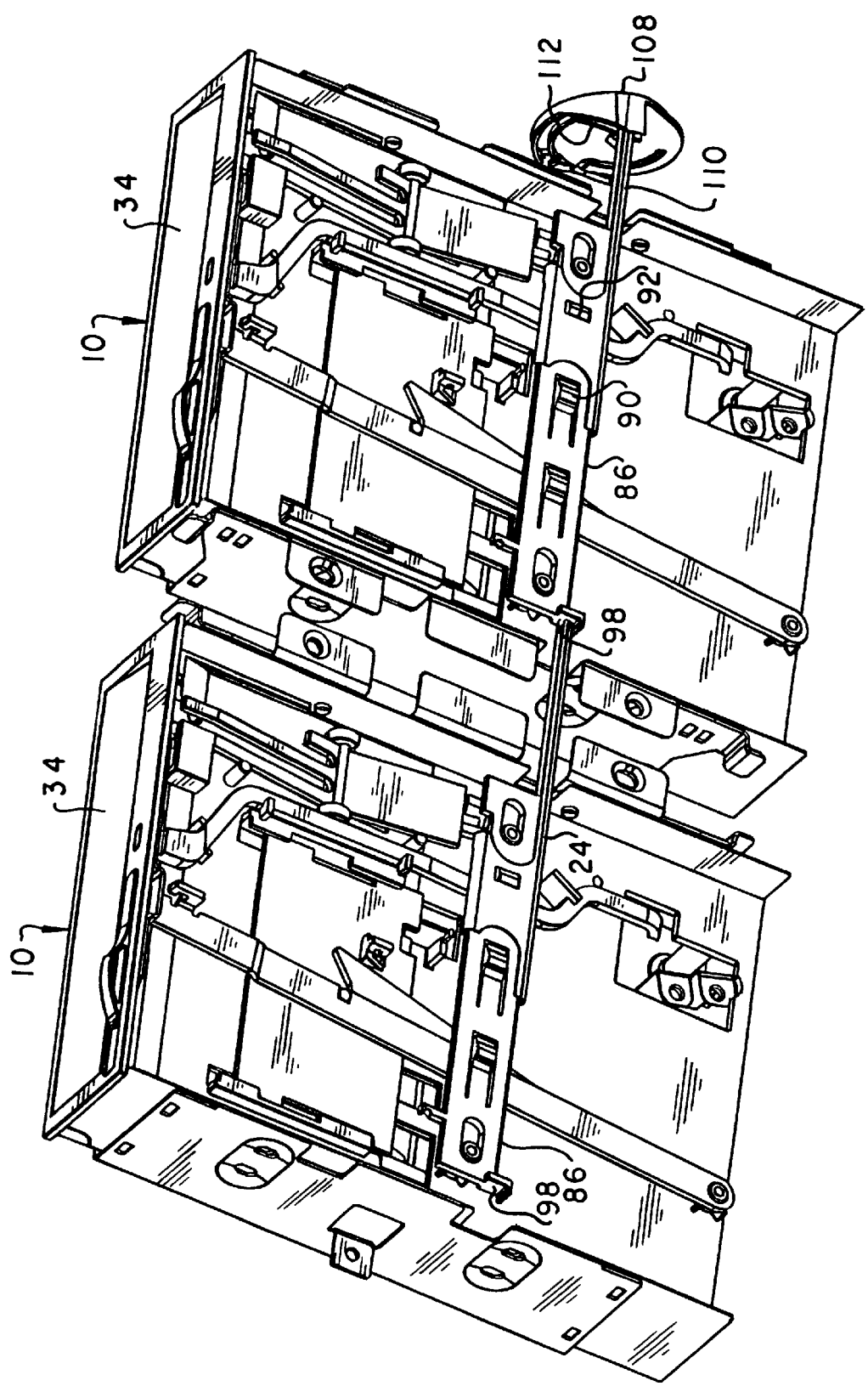
FIG. 4 is a bottom perspective view of multiple ones of the disk drive module of FIG. 1, configured to permit simultaneous operation of a security feature of the drive module.

Referring additionally now to FIG. 4, two disk drive modules 10 are representatively illustrated with disk drives 34 operatively installed therein. Several elements of the disk drive modules 10, such as the springs 62, 88, are not shown for illustrative clarity. FIG. 4 shows a manner in which the security features of two disk drive modules 10 may be conveniently actuated by utilizing a single cam 108.

A somewhat modified bar 110 is shown on the rightmost (as viewed in FIG. 4) disk drive module 10, the modified bar being shorter than the bar 24 on the leftmost disk drive module, to demonstrate one type of modification that may be made without departing from the principles of the present invention. It is to be understood that it is not necessary for the bar 110 to be modified according to the principles of the present invention. For example, the bar 24 could be used on the rightmost disk drive module 10 in place of the bar 110 and the cam 108 could be positioned further laterally outward from the rightmost disk drive module, or the bar 110 could be displaced to another position relative to the actuating member 86 by engaging the opening 92 with another finger 90.

The bar 110 is in contact with an inclined surface 112 formed on the rotatable cam 108. It will be readily appreciated that, as the cam 108 is rotated about its axis, the bar 110 may be laterally displaced by the inclined surface 112. Preferably, the springs 88 (see FIG. 2) bias the bar 110 into lateral contact with the cam 108.

If the inclined surface 112 laterally inwardly displaces the bar 110 relative to the rightmost disk drive module 10, the actuating member 86 on the rightmost disk drive module will correspondingly be laterally displaced, which will cause the bar 24 on the leftmost disk drive module to be laterally inwardly displaced relative to the leftmost disk drive module (due to contact between the bar 24 and the pad 98 on the rightmost disk drive module), thereby also laterally displacing the actuating member on the leftmost disk drive module. As described hereinabove, more than two disk drive modules 10 may be linked.

Figure 5:
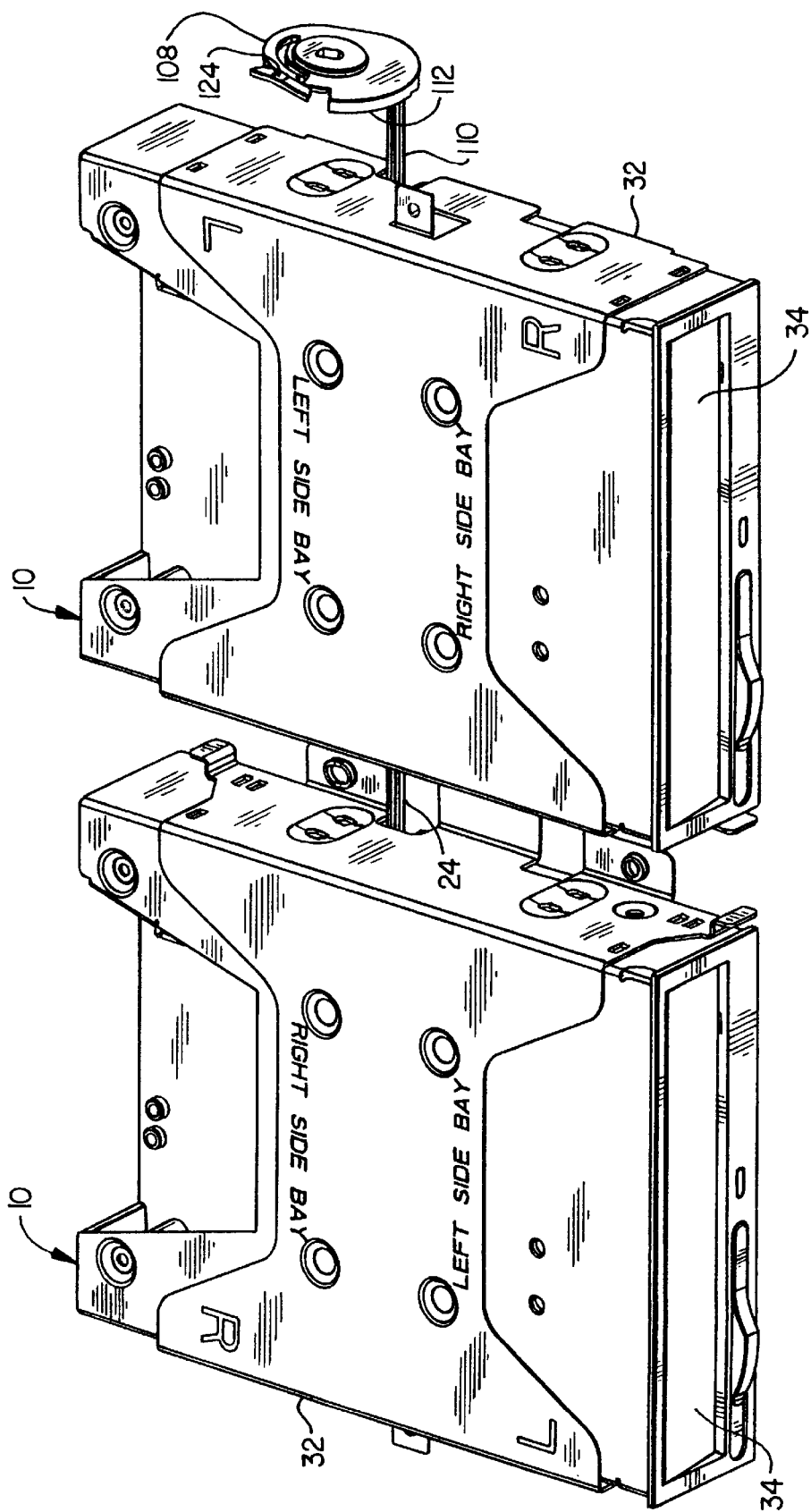
FIG. 5 is a top perspective view of the multiple disk drive modules of FIG. 4.

Referring additionally now to FIG. 5, the linked disk drive modules 10 of FIG. 4 are shown from a top perspective view. In this view, the relative positioning of the disk drive modules 10 within the reversible cages 32 and the cam 108 may be clearly seen. Configured as shown in FIG. 5, the disk drive modules 10, cages 32, and cam 108 may be operatively installed in the docking station 96 shown in FIG. 6. As will be described more fully hereinbelow, when the disk drive modules 10 and cam 108 are operatively installed in the illustrated preferred embodiment of the docking station 96, another bar 24 is utilized in place of the modified bar 110, and the inclined surface 112 on the cam 108 is not in direct contact with the bar 24.

Figure 6:
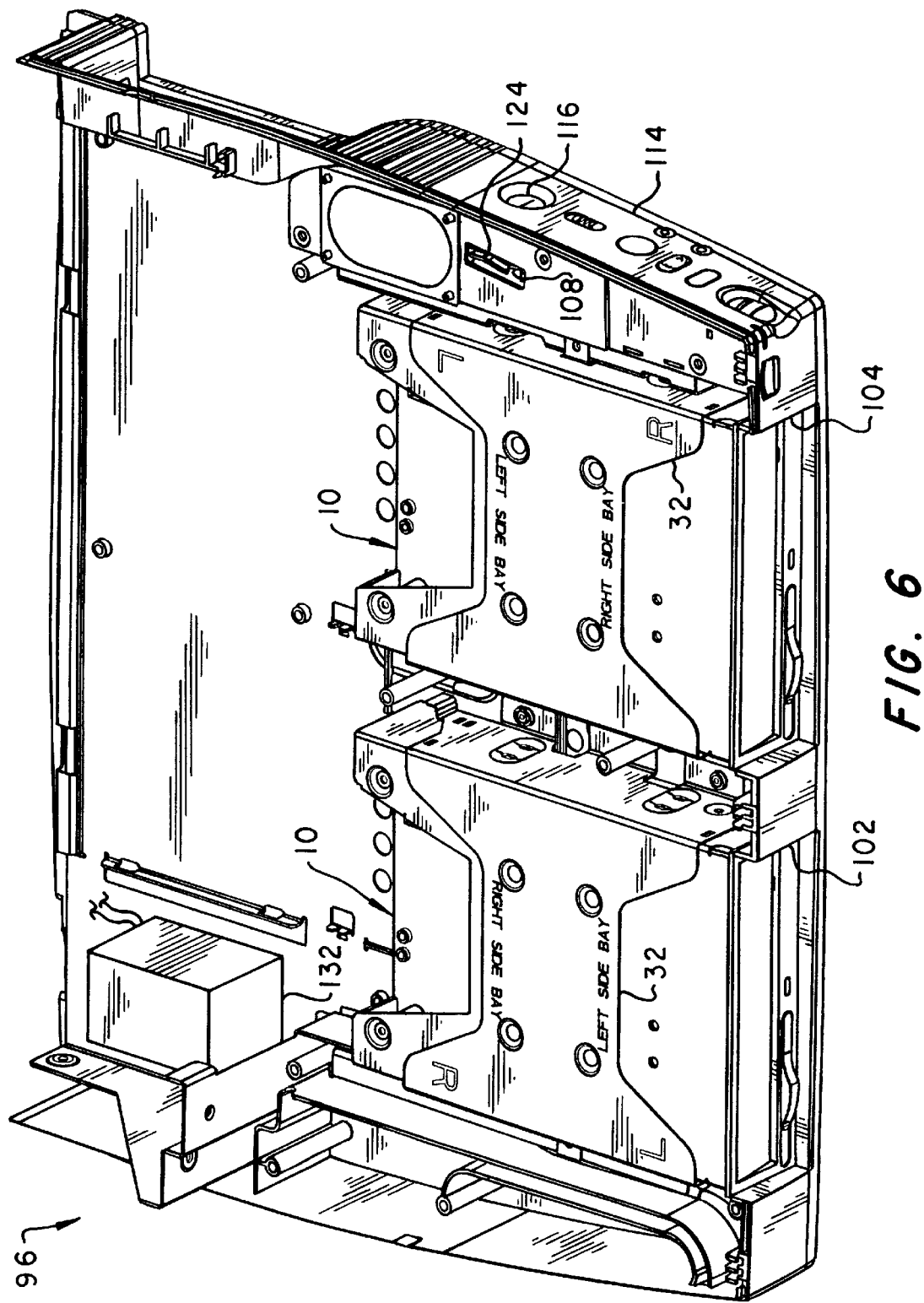
FIG. 6 is a perspective view of the multiple disk drive modules of FIG. 4 operatively configured in half-height bays within a computer docking station embodying principles of the present invention, with top and rear portions of the docking station removed, and showing a control module disposed therein.

Referring additionally to FIG. 6, the disk drive modules 10 are shown operatively installed in the docking station 96. For illustrative clarity, portions of the docking station 96 have been removed (see FIG. 8 for a top perspective view of the complete docking station).

The disk drive modules 10 and cages 32 are installed in left and right side bays, 102 and 104, respectively, formed in the docking station 96. The bays 102, 104 are configured to correspond dimensionally to industry-standard half-height bays. Thus, it is not necessary for the disk drive modules 10 to be installed in the bays 102, 104, since conventional half-height disk drives, tape drives, CD-ROM drives, etc. may alternatively be installed in the bays.

In the illustrated preferred embodiment, the cages 32 are configured to accept such alternative half-height drives, etc., so that the cages may be utilized even if the disk drive modules 32 are not utilized in the docking station 96. For this purpose, the mounting holes 22 on the disk drive modules 10 (see FIG. 1) may be positioned according to mounting holes typically provided on conventional half-height disk drives. It is to be understood that it is not necessary for the disk drive modules 10 to be dimensioned according to conventional half-height drives, for the disk drive modules to be mounted similar to conventional half-height drives, or for the disk drive modules to be installed in half-height bays according to the principles of the present invention.

The cam 108 is rotatably mounted within a control module 114 of the docking station 96. The control module 114 includes switches, lights, jacks, etc. for controlling, accessing, indicating, etc. various functions of a computer (not shown) docked with the docking station 96. The control module 114 also includes a keyed lock mechanism 116, which, when an appropriate key (not shown) is inserted therein, permits the cam 108 to be rotated thereby. Thus, the security features of the disk drive modules 10 may be actuated by rotating the key lock mechanism 116, in turn rotating the cam 108, and causing the bars 24 to be laterally displaced relative to the disk drive modules 10.

Referring additionally now to FIG. 7, a portion of the docking station 96 is representatively illustrated from a bottom plan view thereof. In this view, the relationship between the disk drive module 10 and the control module 114 adjacent thereto may be easily seen.

The bar 24 is shown in FIG. 7 as being positioned relative to the actuating member 86 so that it is laterally inwardly retracted within the disk drive module 10. The bar 24 is shown in this position to illustrate how the security feature may be conveniently deactivated so that, no matter the rotational position of the cam 108, the bar 24 cannot be laterally displaced by the cam. It is to be understood, however, that in normal installations, in which it is desired for the security feature to be actuatable by rotation of the cam 108, the bar 24 extends laterally outward from the disk drive module 10 as shown in FIG. 2.

In FIG. 7 it may be seen that the key lock mechanism 116 is mounted to the control module 114, and the cam 108 is secured to the key lock mechanism. Thus, when the key lock mechanism 116 is rotated by, for example, inserting a key thereinto and rotating the key, the cam 108 is rotated about its axis.

As representatively illustrated in FIG. 7, the control module 114 includes a cam follower or lever 94. The lever 94 is pivotably mounted to a post 118 formed on the control module 114 and is biased into contact with the inclined surface 112 of the cam 108 by a spirally wound spring 120 encircling the post 118. As the cam 108 is rotated about its axis, the lever 94 is made to laterally displace relative to the disk drive module 10, the lever 94 following the inclined surface 112 on the cam.

When the bar 24 is properly positioned so that it extends laterally outward from the disk drive module 10, the spring 88 laterally biases the actuating member 86 and, thus, causes the bar to contact the lever 94. As shown in FIG. 7, the spring 88 is disconnected from the actuating member 86, but it is to be understood that in normal operation the spring is connected to the actuating member as shown in FIG. 2. Therefore, when the lever 94 is laterally displaced by rotation of the cam 108, the bar 24 is also laterally displaced thereby.

A switch 120 is operatively mounted within the control module 114 and is positioned relative to the cam 108 so that the switch may be opened or closed by rotation of the cam. Specifically, a rear surface 122 formed on the cam 108 includes a portion 124 (see FIGS. 5 & 6) which depresses the switch 120 (thereby closing the switch) when the key lock mechanism 116 is rotated to disable the security features of the disk drive modules 10, and which releases the switch (thereby opening the switch) when the key lock mechanism is rotated to enable the security features. The switch 120 is interconnected between a power supply 132 of the docking station 96 via a circuit board 126 mounted within the control module 114 and the disk drive modules 10. Thus, when the switch 120 is closed, power is available to the disk drive modules 10 for operating disk drives 34 operatively installed therein, and when the switch is open, power is not available to the disk drive modules and the disk drives are inoperable, thereby preventing access thereto.

It will be readily appreciated that multiple disk drive modules 10 may be linked together as generally shown in FIG. 4 and security features of each of such linked multiple disk drive modules may be simultaneously actuated by rotation of the single key lock mechanism 116. Of course, mechanisms other than the key lock mechanism 116 may be utilized to actuate the security features of linked multiple disk drive modules 10 without departing from the principles of the present invention. Likewise, other means of laterally displacing the bar 24 relative to the disk drive module 10 may be utilized without departing from the principles of the present invention.

Figure 8:
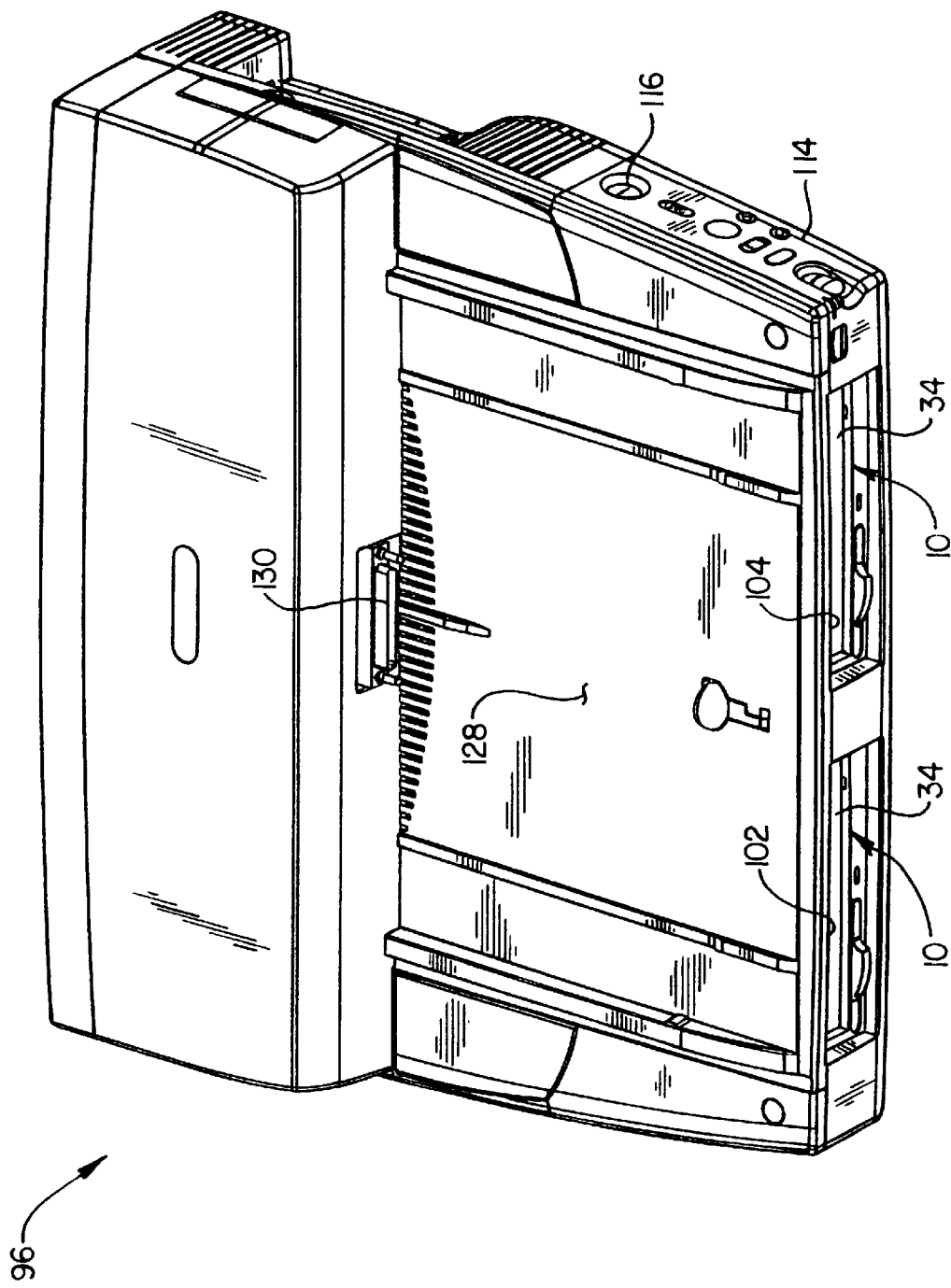
FIG. 8 is a top, right, and front perspective view of the computer docking station of FIG. 6.

Referring additionally now to FIG. 8, the docking station 96 is shown from a top perspective view thereof. The disk drive modules 10 are operatively installed in the left and right bays 102 and 104, respectively. The control module 114 of the docking station 96 is installed therein. The key lock mechanism 116 is installed in the control module 114.

The docking station 96 includes an upper side surface 128 on which a computer (not shown) may be supported and slid rearwardly to interconnect the computer with a connector 130, thereby permitting power, data, etc. communication between the computer and the docking station.

When it is desired for the security feature of each of the disk drive modules 10 to be actuated, the key lock mechanism 116 may be rotated accordingly. For example, the key lock mechanism 116 may be rotated clockwise to enable the security feature and thereby prevent ejection of the disk drive 34 from either of the disk drive modules 10 and prevent power from being supplied to operate the disk drive 34. Likewise, the key lock mechanism 116 may be rotated counterclockwise to disable the security feature and thereby permit ejection of the disk drive 34 from both of the disk drive modules 10.

Alternatively, the bar 24 of the rightmost disk drive module 10 (as viewed in FIG. 8) may be positioned relative to the actuating member 86 as shown in FIG. 7 in order to prevent actuation of the security features of either of the disk drive modules, in which case the disk drives 34 may be ejected from the disk drive modules 10, but the switch 120 may still be utilized to otherwise prevent operation of the disk drive modules. As another alternative, the bar 24 of the leftmost disk drive module 10 (as viewed in FIG. 8) may be positioned relative to the actuating member 86 as shown in FIG. 7 in order to prevent actuation of the security feature of only the leftmost disk drive module, so that only the security feature of the rightmost disk drive module may be actuated by rotation of the key lock mechanism 116.

Thus has been described the computer docking station 96 which includes the capability of operatively accepting portable disk drives 34 therein without a corresponding increase in the security concerns associated therewith. The user's convenience is enhanced by permitting use of the disk drives 34 therein. However, the docking station 96 does not permit unauthorized access to disk drives 34 installed therein and does not permit the disk drives to be ejected from the disk drive modules 10 when security features thereof are enabled. Additionally, the disk drive modules 10 may be variously configured to provide different levels of security associated therewith in the docking station 96.

The foregoing detailed description is to be clearly understood as being given by way of illustration and example only, the spirit and scope of the present invention being limited solely by the appended claims.

What is claimed is:

1. Apparatus for operatively and removably receiving a disk drive therein, the apparatus comprising:
    an enclosure having an opening formed thereon, said opening being complementarily shaped for receiving the disk drive therein;
    an ejection member disposed on said enclosure, and displaceable relative to said enclosure in a first direction to thereby eject the disk drive when the disk drive is received in the enclosure; and
    a latching member disposed on said enclosure, and selectively moveable relative thereto into blocking engagement with said ejection member, thereby preventing displacement of said ejection member relative to said enclosure in said first direction.

2. The apparatus according to claim 1, further comprising an actuating member slidably disposed on said enclosure, said actuating member being positionable in a selected one of a first position in which said actuating member biases said latching member to engage said ejection member, and a second position in which said actuating member permits said latching member to be disengaged from said ejection member.

3. The apparatus according to claim 1, wherein said latching member is pivotably disposed relative to said enclosure between opposite ends of said latching member, one of said opposite ends being configured for cooperative engagement with said ejection member, and said latching member being capable of pivoting relative to said enclosure in a second direction to engage said one of said opposite ends with said ejection member, and in a third direction to disengage said one of said opposite ends from said ejection member.

4. The apparatus according to claim 3, further comprising an actuating member slidably disposed on said enclosure, said actuating member being positionable in a selected one of a first position in which said actuating member biases the other of said opposite ends of said latching member to pivot said latching member in said second direction, and a second position in which said actuating member permits said latching member to pivot in said third direction.

5. The apparatus according to claim 4, wherein said actuating member has an inclined surface formed thereon, said inclined surface being capable of contacting said other of said opposite ends to pivot said latching member in said second direction when said actuating member is displaced relative to said enclosure.

6. The apparatus according to claim 2, further comprising an extension member attached to said actuating member, said extension member being capable of extending outwardly from said enclosure, and said extension member being capable of displacing said actuating member relative to said enclosure when said extension member is displaced relative to said enclosure.

7. The apparatus according to claim 6, wherein said extension member is selectively positionable relative to said actuating member between at least first and second positions, said extension member extends outwardly from said enclosure when said extension member is in said first position relative to said actuating member, and wherein said extension member is retracted within said enclosure when said extension member is in said second position relative to said actuating member.

8. The apparatus according to claim 6, wherein one of said extension member and said actuating member has a series of spaced apart resilient members formed thereon and the other of said extension member and said actuating member has a complementarily shaped aperture formed thereon, whereby said extension member is selectively positionable relative to said actuating member by disposing a selected one of said resilient members in said aperture.

9. Apparatus for operatively and removably receiving a plurality of disk drives therein, the apparatus comprising:
    first and second disk drive modules, each of said first and second disk drive modules including:
        an enclosure having an opening formed thereon, said opening being complementarily shaped for receiving one of the disk drives therein;
        an ejection member disposed on said enclosure, and displaceable relative to said enclosure in a first direction to thereby eject the disk drive when the disk drive is received in the enclosure;
        a latching member disposed on said enclosure, and selectively moveable relative thereto into blocking engagement with said ejection member, displacement of said ejection member relative to said enclosure in said first direction; and
        an actuating member slidably disposed on said enclosure, said actuating member being positionable in a selected one of a first position in which said actuating member biases said latching member to engage said ejection member, and a second position in which said actuating member permits said latching member to be disengaged from said ejection member.

10. The apparatus according to claim 9, wherein each of said actuating members is disposed relative to the other ones of said actuating members, such that said actuating members are simultaneously positionable in said selected one of said first and second positions.

11. The apparatus according to claim 9, further comprising an extension member attached to each of said actuating members, each of said extension members being attached to one of said actuating members.

12. The apparatus according to claim 11, wherein each of said extension members contacts another one of said actuating members, such that displacement of said one of said actuating members relative to a corresponding one of said enclosures is transmitted to said another one of said actuating members via one of said extension members.

13. The apparatus according to claim 11, wherein each of said extension members is selectively positionable relative to a corresponding one of said actuating members between at least first and second positions, each of said extension members being capable of extending outwardly from a corresponding one of said enclosures when said extension member is in said first position relative to said corresponding one of said actuating members.

14. The apparatus according to claim 11, further comprising a cam, said cam having a surface profile formed thereon, and said cam being capable of displacing at least one of said actuating members between said first and second positions.

15. The apparatus according to claim 14, further comprising a first extension member attached to said at least one actuating member, said first extension member being capable of contacting said surface profile, and said first extension member being capable of being displaced by displacement of said cam to thereby displace said at least one actuating member between said first and second positions.

16. The apparatus according to claim 15, further comprising a second extension member attached to another one of said actuating members, said second extension member being capable of contacting said at least one actuating member, and said second extension member being capable of being displaced by displacement of said at least one actuating member.

17. A computer docking station, comprising:
at least one disk drive module for operatively and removably receiving a disk drive therein, said at least one disk drive module including:
an enclosure having an opening formed thereon, said opening being complementarily shaped for receiving the disk drive therein;
an ejection member disposed on said enclosure, and displaceable relative to said enclosure in a first direction to thereby eject the disk drive when the disk drive is received in the enclosure; and
a latching member disposed on said enclosure, and selectively moveable relative thereto into blocking engagement with said ejection member, displacement of said ejection member relative to said enclosure in said first direction.

18. The docking station according to claim 17, wherein said at least one disk drive module further includes an actuating member slidably disposed on said enclosure, said actuating member being positionable in a selected one of a first position in which said actuating member biases said latching member to engage said ejection member, and a second position in which said actuating member permits said latching member to be disengaged from said ejection member.

19. The docking station according to claim 17, wherein said latching member is pivotably disposed relative to said enclosure between opposite ends of said latching member, one of said opposite ends being configured for cooperative engagement with said ejection member, and said latching member being capable of pivoting relative to said enclosure in a second direction to engage said one of said opposite ends with said ejection member, and in a third direction to disengage said one of said opposite ends from said ejection member.

20. The docking station according to claim 19, wherein said at least one disk drive module further includes an actuating member slidably disposed on said enclosure, said actuating member being positionable in a selected one of a first position in which said actuating member biases the other of said opposite ends of said latching member to pivot said latching member in said second direction, and a second position in which said actuating member permits said latching member to pivot in said third direction.

21. The docking station according to claim 20, wherein said actuating member has an inclined surface formed thereon, said inclined surface being capable of contacting said other of said opposite ends to pivot said latching member in said second direction when said actuating member is displaced relative to said enclosure.

22. The docking station according to claim 17, wherein said at least one disk drive module further includes an extension member attached to said actuating member, said extension member being capable of extending outwardly from said enclosure, and said extension member being capable of displacing said actuating member relative to said enclosure when said extension member is displaced relative to said enclosure.

23. The docking station according to claim 22, wherein said extension member is selectively positionable relative to said actuating member between at least first and second positions, said extension member extends outwardly from said enclosure when said extension member is in said first position relative to said actuating member, and wherein said extension member is retracted within said enclosure when said extension member is in said second position relative to said actuating member.

24. The docking station according to claim 22, wherein one of said extension member and said actuating member has a series of spaced apart resilient members formed thereon and the other of said extension member and said actuating member has a complementarily shaped aperture formed thereon, whereby said extension member is selectively positionable relative to said actuating member by disposing a selected one of said resilient members in said aperture.

25. The docking station according to claim 22, further comprising a cam disposed within a housing of said docking station, said cam being capable of contacting said extension member on a surface of said cam, and said cam being displaceable relative to said housing to thereby displace said extension member relative to said enclosure.

26. The docking station according to claim 17, further comprising a power supply and a switch, said switch being interconnected between said power supply and said at least one disk drive module.

27. The docking station according to claim 26, further comprising a cam and a locking mechanism, said cam being attached to said locking mechanism, said locking mechanism being attached to a housing of said docking station, and said cam being displaceable by operation of said locking mechanism to thereby operate said switch and selectively communicate power between said power supply and said at least one disk drive module.

28. A computer docking station, comprising:
first and second disk drive modules, each of said first and second disk drive modules including:
an enclosure having an opening formed thereon, said opening being complementarily shaped for receiving a disk drive therein;
an ejection member disposed on said enclosure, and displaceable relative to said enclosure in a first direction to thereby eject the disk drive when the disk drive is received in the enclosure;
a latching member disposed on said enclosure, and selectively moveable relative thereto into blocking engagement with said ejection member, displacement of said ejection member relative to said enclosure in said first direction; and an actuating member slidably disposed on said enclosure, said actuating member being positionable in a selected one of a first position in which said actuating member biases said latching member to engage said ejection member, and a second position in which said actuating member permits said latching member to be disengaged from said ejection member.

29. The docking station according to claim 28, wherein each of said actuating members is disposed relative to the other ones of said actuating members, such that said actuating members are simultaneously positionable in said selected one of said first and second positions.

30. The docking station according to claim 28, further comprising an extension member attached to each of said actuating members, each of said extension members being attached to one of said actuating members.

31. The docking station according to claim 30, wherein each of said extension members contacts another one of said actuating members, such that displacement of said one of said actuating members relative to a corresponding one of said enclosures is transmitted to said another one of said actuating members via one of said extension members.

32. The docking station according to claim 30, wherein each of said extension members is selectively positionable relative to a corresponding one of said actuating members between at least first and second positions, each of said extension members being capable of extending outwardly from a corresponding one of said enclosures when said extension member is in said first position relative to said corresponding one of said actuating members.

33. The docking station according to claim 30, further comprising a cam, said cam having a surface profile formed thereon, and said cam being capable of displacing at least one of said actuating members between said first and second positions.

34. The docking station according to claim 33, further comprising a first extension member attached to said at least one actuating member, said first extension member being capable of contacting said surface profile, and said first extension member being capable of being displaced by displacement of said cam to thereby displace said at least one actuating member between said first and second positions.

35. The docking station according to claim 34, further comprising a second extension member attached to another one of said actuating members, said second extension member being capable of contacting said at least one actuating member, and said second extension member being capable of being displaced by displacement of said at least one actuating member.

36. The docking station according to claim 28, further comprising a power supply and a switch, said switch being interconnected between said power supply and at least one of said first and second disk drive modules.

37. The docking station according to claim 36, further comprising a cam and a locking mechanism, said cam being attached to said locking mechanism, said locking mechanism being attached to a housing of said docking station, and said cam being displaceable by operation of said locking mechanism to thereby operate said switch and selectively communicate power between said power supply and said at least one disk drive module.

* * * * *